United States Patent [19]

Chambers, Jr.

[11] 4,032,726
[45] June 28, 1977

[54] REPEATER FOR TRANSMISSION LINES OF DIFFERING LENGTHS

[75] Inventor: Charles W. Chambers, Jr., Amherst, Ohio

[73] Assignee: Lorain Products Corporation, Lorain, Ohio

[22] Filed: July 8, 1976

[21] Appl. No.: 703,556

Related U.S. Application Data

[62] Division of Ser. No. 560,257, March 20, 1975, Pat. No. 3,989,907.

[52] U.S. Cl. .......................... 179/170 G; 179/16 F
[51] Int. Cl.² ......................................... H04B 3/16
[58] Field of Search ............ 79/170 R, 170 G, 16 F

[56] References Cited
UNITED STATES PATENTS

| | | | |
|---|---|---|---|
| 3,706,862 | 12/1972 | Chambers, Jr. ................ | 179/170 R |
| 3,818,151 | 6/1974 | Chambers, Jr. et al. ...... | 179/170 R |
| 3,828,281 | 8/1974 | Chambers, Jr. ............... | 179/170 G |

Primary Examiner—Kathleen H. Claffy
Assistant Examiner—Randall P. Myers
Attorney, Agent, or Firm—Edward C. Jason; Michael M. Rickin

[57] ABSTRACT

A circuit for varying the amplification afforded to a-c signals transmitted through a transmission line in accordance with the a-c losses of that transmission line. Gain control circuitry is provided which varies the magnitude of amplifying voltages and currents inserted into the transmission line in accordance with the a-c losses of that transmission line. The gain control circuitry is comprised of a line resistance sensor which establishes a contol signal which is a function of the a-c losses of the transmission line. This control signal is applied to the remainder of the gain control circuitry to vary the magnitude of voltages and currents inserted into the transmission line in accordance with that control signal. As a result, the gain control circuitry automatically adjusts the gain of a repeater in accordance with each transmission line connected thereto.

8 Claims, 6 Drawing Figures

REPEATER FOR TRANSMISSION LINES OF DIFFERING LENGTHS

This is a division of application Ser. No. 560,257 filed Mar. 20, 1975 now U.S. Pat. No. 3,989,907.

BACKGROUND OF THE INVENTION

The present invention relates to circuitry for amplifying signals transmitted through a transmission line and is directed more particularly to circuitry which automatically varies the amplification afforded to signals transmitted through a telephone transmission line in accordance with the a-c losses of that line.

In communication systems wherein a-c signals are transmitted through transmission lines, it is often necessary to provide circuitry which compensates for the attenuation of those signals on transmission through those lines. In some telephone systems, for example, it is necessary to compensate for the attenuation of a-c signals in a loaded transmission line. In these systems, an amplifier circuit, or repeater, provides a relatively flat or fixed gain which, when combined with the attenuation characteristic of the transmission line, establishes an overall response of the system including the repeater and the transmission line which decreases the attenuation of signals transmitted therethrough while retaining the desirable frequency response characteristics of the transmission line. One such repeater is shown and described in U.S. Pat. No. 3,706,862 granted in the name of C. W. Chambers, Jr. on Dec. 19, 1972.

Due to the relatively high cost of purchasing and operating a separate repeater for each transmission line, it has been found desirable to operate fixed gain repeaters in a common mode configuration, i.e., switch a relatively small number of repeaters among a relatively large number of occasionally used transmission lines. A problem with switching a fixed gain repeater among several loaded transmission lines is that the attenuation of a loaded transmission line varies in proportion to the length of that line. As a result, the fixed gain provided by that repeater may establish a desirable system response (e.g., 6 db system loss) for a particular length of transmission line, but will be unable to establish that same level of system loss for a different length of transmission line. One attempt to overcome this problem has been the practice to group together loaded transmission lines of similar gauges and lengths in a common mode configuration with a fixed gain repeater which is operable with any member of the group.

Another attempt to overcome the problem associated with switching a repeater among several transmission lines has been the practice of varying the gain of a repeater in accordance with the magnitude of current flow through the transmission line. Circuitry of the above type is shown and described in the U.S. patent of Laimons Freimanis, U.S. Pat. No. 3,851,108 entitled "Communication Line Supervisory Circuit." Although the circuitry described in the above-mentioned U.S. patent does vary the gain of a repeater in accordance with the line current flowing through the transmission line, that circuitry does not vary the gain of a repeater either in accordance with the a-c losses or the length of that transmission line. This is because the current through the transmission line may be increased due to boost voltages being applied to that transmission line. As a result, the gain established by a repeater of the above type which is connected to a particular length transmission line which does not have boost voltages applied thereto may be less than the gain established by that repeater when connected to the same length of transmission line having boost voltages applied thereto. Since the a-c losses of a transmission line are a function of the length of the transmission line, the circuitry described in the above-mentioned U.S. Patent is unsatisfactory for use in a common mode configuration wherein transmission lines may have boost voltages applied thereto. Prior to the present invention, loaded transmission lines of differing lengths could not be grouped together and utilized in a common mode configuration.

In telephone systems wherein a repeater is inserted into the transmission line, it is necessary to physically break the transmission line and insert the repeater at this break. Looking into both ends of the transmission line at this break, it may be shown that, ordinarily, the impedance of one section of the transmission line will be different from the impedance of the other section of the transmission line. As a result, the impedance mismatch resulting from the insertion of a repeater into the transmission line will give rise to undesirable echoes of the a-c signal transmitted therethrough.

In order to prevent impedance mismatches from interfering with the transmission of a-c signals through telephone transmission lines, it has been the practice to provide a repeater with passive impedance matching circuits, or line build out networks, which may be adjusted to establish a predetermined impedance (e.g., a 900 ohm resistance) for each section of the transmission line. Circuitry of the above type is shown and described in the U.S. Patent of R. L. Huxtable, U.S. Pat. No. 2,978,542, entitled "Impedance-Matching Network." When connected to a different length of transmission line, this type of circuitry requires the extensive readjustment of impedances inserted in the line and is, therefore, unsuitable for use with repeaters which are utilized in a common mode configuration.

Another attempt to prevent impedance mismatches from interfering with the transmission of a-c signals through telephone transmission lines has been the utilization of a repeater with active impedance matching circuits, or impedance simulating circuits, which may also be adjusted to establish a predetermined impedance for each section of the transmission line. Circuitry of this type is shown and described in the U.S. Patent of Charles W. Chambers, Jr., U.S. Pat. No. 3,828,281, entitled "Impedance Simulating Circuit For Transmission Lines." When connected to a different length of transmission line, this type of circuitry requires readjustment of the magnitudes of the impedance simulating voltages and currents applied to the transmission line and is, therefore, unsuitable for use with repeaters which are utilized in a common mode configuration. Prior to the present invention, neither a line build out network nor an impedance simulating circuit could be utilized with a repeater in a common mode configuration and prevent impedance mismatches from occurring due to the insertion of the repeater into the transmission line.

In accordance with a first embodiment of the present invention, there is provided circuitry which automatically varies the magnitude of amplifying voltages and currents which are applied to a transmission line to establish substantially the same system loss for transmission lines of differing lengths and gauges. In accordance with a second embodiment of the present invention, there is provided impedance matching circuitry which automatically varies the magnitude of impedance simulating voltages and currents which are applied to a transmission line in accordance with the a-c losses of that transmission line to prevent echoes from occurring due to the insertion of a repeater into the transmission line.

SUMMARY OF THE INVENTION

It is an object of the invention to provide improved circuitry for modifying the transmission characteristics of telephone transmission lines.

Another object of the invention is to provide repeater circuitry having a gain characteristic which varies automatically as a function of the a-c losses of a transmission line so that a predetermined level of system loss is maintained.

A further object of the invention is to provide impedance matching circuitry having an impedance matching characteristic which varies automatically as a function of the a-c losses of a transmission line so that mismatches in the impedances of different sections of transmission lines are prevented.

It is another object of the invention to provide improved repeater circuitry including circuitry for establishing a control signal which varies in accordance with the a-c losses of a transmission line and circuitry for varying the magnitude of voltages and currents inserted in the transmission line in accordance with that control signal.

Still another object of the invention is to provide improved impedance matching circuitry including circuitry for establishing a control signal which varies in accordance with the a-c losses of the transmission line and circuitry for varying the magnitude of impedance simulating voltages and currents inserted in the transmission line in accordance with that control signal.

Another object of the invention is to provide circuitry for establishing a control signal which varies in accordance with the a-c losses of a transmission line.

Still another object of the invention is to provide circuitry which indicates the a-c losses of a transmission line by establishing a control signal which is proportional to the d-c resistance of that transmission line.

A further object of the invention is to provide circuitry which indicates the d-c resistance of a transmission line by electronically dividing the magnitude of the instantaneous voltage across the transmission line by the magnitude of the instantaneous current through the transmission line.

Yet another object of the invention is to provide improved repeater circuitry which varies the gain thereof by varying the magnitude of voltages and currents inserted into the transmission line in accordance with the magnitude of a control signal.

Still another object of the invention is to provide improved impedance matching circuitry which varies the impedance matching characteristics thereof by varying the magnitude of voltages and currents inserted into the transmission line in accordance with the magnitude of a control signal.

DESCRIPTION OF THE INVENTION

Figure 1:
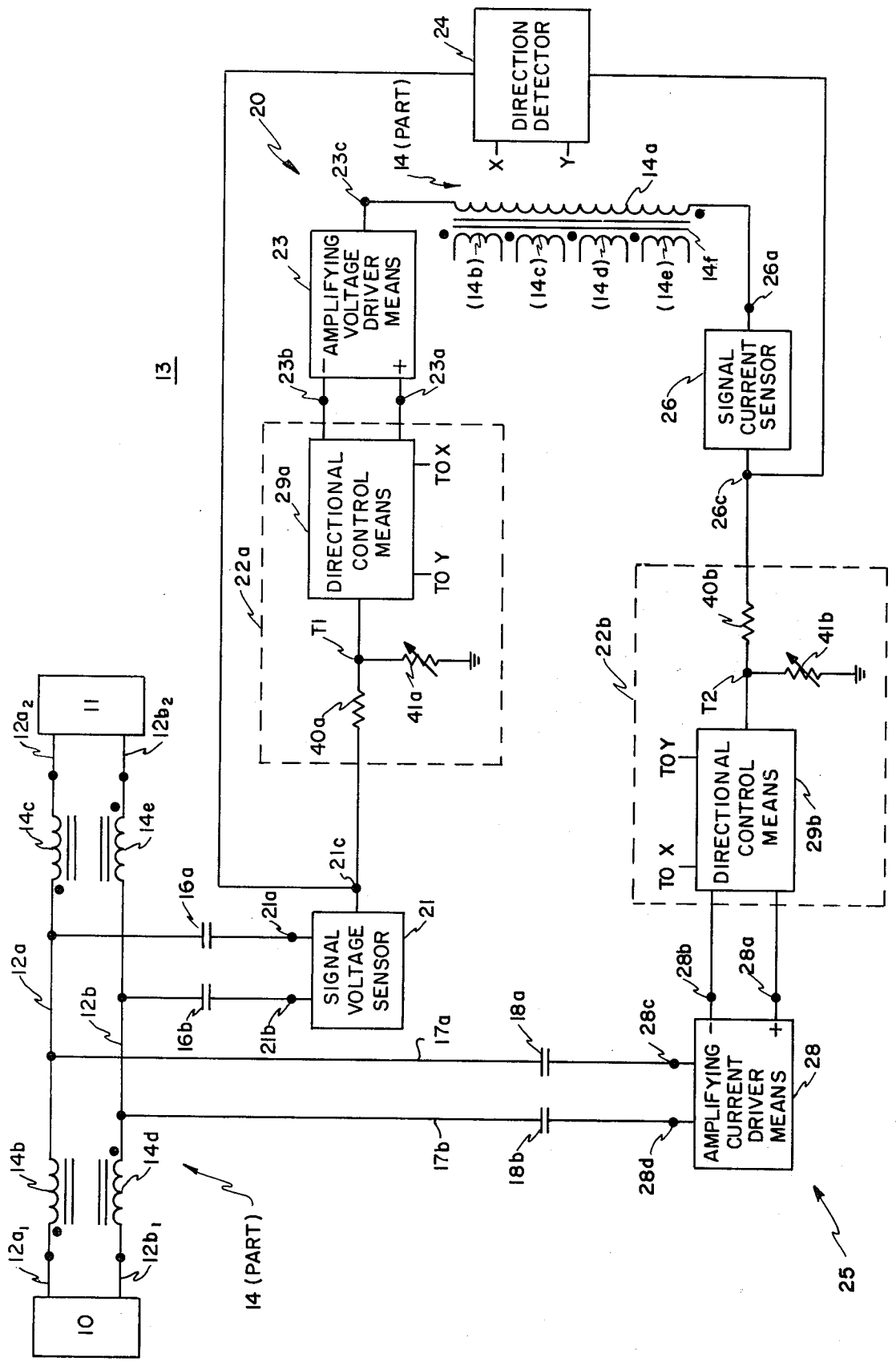
FIG. 1 is a combined block-schematic diagram which illustrates a repeater known to the art.

In the development of circuitry for transmitting voice frequency signals over transmission lines, a variety of repeater type circuits have been employed. One of these repeater type circuits is a repeater having a series amplifying network for inserting, in series with the transmission line, an amplifying voltage which varies in accordance with the signal voltage across the transmission line and a shunt amplifying network for inserting, in shunt with the transmission line, an amplifying current which varies in accordance with the signal current through the transmission line. In such circuits, it may be shown that if the ratio of amplifying voltage to signal voltage is equal in magnitude but opposite in sign to the ratio of amplifying current to signal current, the circuit may function as an impedance matching circuit. It may also be shown that if the above ratios are equal in magnitude and have the same sign, then the circuit may function as a repeater which compensates for the attentuation of a-c signals on transmission through non-loaded transmission lines. Repeater type circuits of these types will hereinafter be referred to as amplifying type repeaters.

Another of these repeater type circuits is a repeater having impedance simulating networks which provide gain by simulating the presence of negative resistances (or impedances) in series and/or in shunt with the transmission line. These impedance simulating networks may also be utilized to simulate the presence of positive impedances and thereby serve as a line build-out network or attenuator pad. Circuits of either of these types will hereinafter be referred to as impedance simulating type circuits.

In accordance with the first embodiment of the present invention, there is provided circuitry which automatically varies the gain of an amplifying type repeater, in accordance with the a-c losses of a transmission line to establish a substantially constant system loss for loaded transmission lines of differing lengths. In accordance with a second embodiment of the present invention, there is provided circuitry which automatically varies the magnitude of impedances established by an impedance simulating type circuit in accordance with the a-c losses of the transmission line in order to prevent impedance mismatches from giving rise to undesirable echoes.

Amplifying Type Repeater Having A Fixed Gain

As previously mentioned, amplifying type repeaters having series and shunt amplifying networks may be used to compensate for the attenuation of a-c signals transmitted through a transmission line. One of these networks, shown as repeater 13 in FIG. 1, compensates for the frequency independent attenuation of a loaded transmission line by establishing a relatively flat or fixed gain which, when combined with the attenuation of the transmission line, decreases the attenuation of signals transmitted therethrough and yet retains the desirable frequency response characteristics of the transmission line. Circuitry of the above character is shown and described, in detail, in the U.S. patent of Charles W. Chambers, Jr., et al., U.S. Pat. No. 3,818,151 entitled "Method and Apparatus for Amplifying Signal Transmission Through Transmission Lines," the disclosure of which is hereby expressly incorporated herein by reference.

Due to the differing distributed capacitances of loaded transmission lines of differing lengths, however, the frequency independent gain provided by a repeater of the type shown in FIG. 1 although sufficient to establish a desirable system loss (e.g., a 6 db loss) for a particular length of transmission line, is inadequate to establish that same level of system loss for a different length of transmission line. This is because the attenuation of an a-c signal varies directly in proportion to the length of the transmission line.

One embodiment of the present invention comprises an amplifying type repeater in which the magnitude of the frequency independent gain characteristic provided thereby is adjusted automatically so that the repeater adapts itself to operate with transmission lines of a variety of lengths. In other words, the circuitry of the invention varies the gain provided by the repeater in accordance with the a-c losses of the transmission line.

In order to facilitate an understanding of the operation of the circuitry of the present invention, the operation of the manually adjustable repeater 13 shown in FIG. 1 will now be briefly described. Repeater 13 is connected between a transmitting-receiving station 10 and a transmitting-receiving station 11. Station 10 transmits signals to and receives signals from transmitting-receiving station 11 through the conductor pairs $12a_1-12b_1$ and $12a_2-12b_2$ of a two-wire transmission line and may, for example, comprise a telephone set which is connected, through the conductors of a two-wire telephone line, to a similar telephone set at station 11.

Repeater 13 includes an amplifying voltage generating network 20, an amplifying current generating network 25, a direction detector 24, a coupling transformer 14 having a primary winding 14a and secondary windings 14b, 14c, 14d, and 14e which are wound on a common core 14f, and capacitors 16a, 16b, 18a, and 18b. Amplifying voltage generator 20 senses the signal voltage across the transmission line through capacitors 16a and 16b introduces an amplifying voltage in series with the transmission line through transformer 14. Direction detector 24 assures that the phase relationship between this amplifying voltage and the signal voltage is such that the amplifying voltage assumes a series-aiding relationship with the signal voltage transmitted by the then dominant or louder talking party, for both directions of transmission through the transmission line.

Amplifying current generator 25 senses the signal current in the transmission line through transformer 14 and introduces into the line two equal and opposite currents through capacitors 18a and 18b and conductors 17a and 17b. Direction detector 24 assures that the phase relationships between these amplifying currents and the signal current are such that the amplifying currents assume a series-aiding relationship with the signal current transmitted by the then dominant or louder talking party, for both directions of transmission through the transmission line. Thus, amplifying voltage generating means 20, amplifying current generating means 25, direction detector 24, transformer 14, and capacitors 16a, 16b, 18a, and 18b cooperate to introduce, into the transmission line, amplifying voltages and currents which aid the signal voltages and currents transmitted by the then dominant party.

For purposes of description, the ratio of the sum of the amplifying voltages across windings 14b–14e to the signal voltage across the transmission line will be referred to as the series gain. Similarly, the ratio of the amplifying current generated by current generator 25 to the average value of the signal currents in conductors $12a_1-12a_2$ will hereinafter be referred to as the shunt gain. Based on these definitions, the overall or insertion gain provided by repeater 13 is a function of the series and shunt gains provided by voltage generating means 20 and by current generating means 25, respectively. Thus, a circuit which alters the series or shunt gain alters the insertion gain of the repeater.

As described in U.S. Pat. No. 3,818,151, amplifying voltage generator 20 includes a signal voltage sensor 21 having input terminals 21a and 21b and an output terminal 21c, a series gain control network 22a, and an amplifying voltage driver network 23 having a non-inverting input terminal 23a, an inverting input terminal 23b, and an output terminal 23c. Similarly, amplifying current generator 25 includes a signal current sensor 26 having an input terminal 26a and an output terminal 26c, a shunt gain control network 22b, and an amplifying current driver network 28 having a non-inverting input terminal 28a, an inverting input terminal 28b, and complementary output terminals 28c and 28d.

Directional control means 29a connects sensor output 21c to voltage driver means input 23a when direction detector 24 determines, from the phase relationship between the signals at sensor outputs 21c and 26c, that station 10 is the dominant transmitter and applies a voltage to control means 29a through a conductor X. Similarly, directional control means 29a connects sensor output 21c to voltage driver means input 23b when direction detector 24 determines, from the phase relationship between the signals at sensor outputs 21c and 26c, that station 11 is the dominant transmitter and applies a voltage to control means 29a through a conductor Y. Phase comparison and control circuitry suitable for use in direction detector 24 is described, in detail, in the U.S. Patent of Charles W. Chambers, Jr., U.S. Pat. No. 3,706,862, entitled "Amplifier Circuit for Transmission Lines.".

As described in the aforementioned U.S. Pat. No. 3,818,151, the magnitude of the series gain provided by voltage generator 20 may be manually adjusted so as to accommodate the attenuation characteristics of transmission lines of differing lengths by varying the ratio of the sum of the amplifying voltages across windings 14b–14e to the signal voltage across the transmission line. To this end, there is provided in FIG. 1, a variable voltage divider network comprising a resistor 40a and a variable resistor 41a. The resistance of variable resistor 41a controls the magnitude of the voltage established at tap T1 and, therefore, controls the magnitude of the series gain of voltage generator 20.

Similarly, the magnitude of the shunt gain provided by current generating means 25 may be manually adjusted so as to accommodate the attenuation characteristics of transmission lines of differing lengths by varying the ratio of the amplifying current to the average value of the signal current through the transmission line. To this end, there is provided in FIG. 1, a variable voltage divider network comprising a resistor 40b and a variable resistor 41b. The resistance of variable resistor 41b controls the magnitude of the voltage established at tap T2 and, therefore, controls the magnitude of the shunt gain of current generator 25. Thus, by varying the resistances of variable resistors 41a and 41b, the insertion gain of repeater 13 may be varied, as required, to provide a system response which compensates for the attenuation characteristics of transmission lines of differing lengths.

When repeater 13 is connected to a short transmission line, for example, the resistances of resistors 41a and 41b are adjusted to comprise relatively small fractions of the total resistances of voltage dividers 40a–41a and 40b–41b. Under this condition, amplifying voltage generator 20 establishes a series gain the magnitude of which is relatively small. Similarly, amplifying current generator 25 establishes a shunt gain the magnitude of which is relatively small. Thus, when resistors 41a and 41b are adjusted to have relatively large magnitudes, repeater 13 establishes an insertion gain which accommodates the relatively small attenuation characteristics of a short transmission line.

It will be understood that if the resistances of resistors 41a and 41b are adjusted to comprise relatively large fractions of the total resistances of voltage dividers 40a–41a and 40b–41b, then repeater 13 will establish a relatively large insertion gain which accommodates the relatively large attenuation characteristics of a long transmission line. Thus, by adjustment of resistors 41a and 41b, the insertion gain provided by repeater 13 may be varied so as to maintain a desirable system response for differing lengths of transmission lines.

In accordance with one embodiment of the invention, there is provided circuitry for automatically varying the series and shunt gains of an amplifying type repeater in accordance with the a-c losses of the transmission line so as to establish an insertion gain which compensates for the attenuation characteristics of transmission lines for differing lengths.

Figure 2:
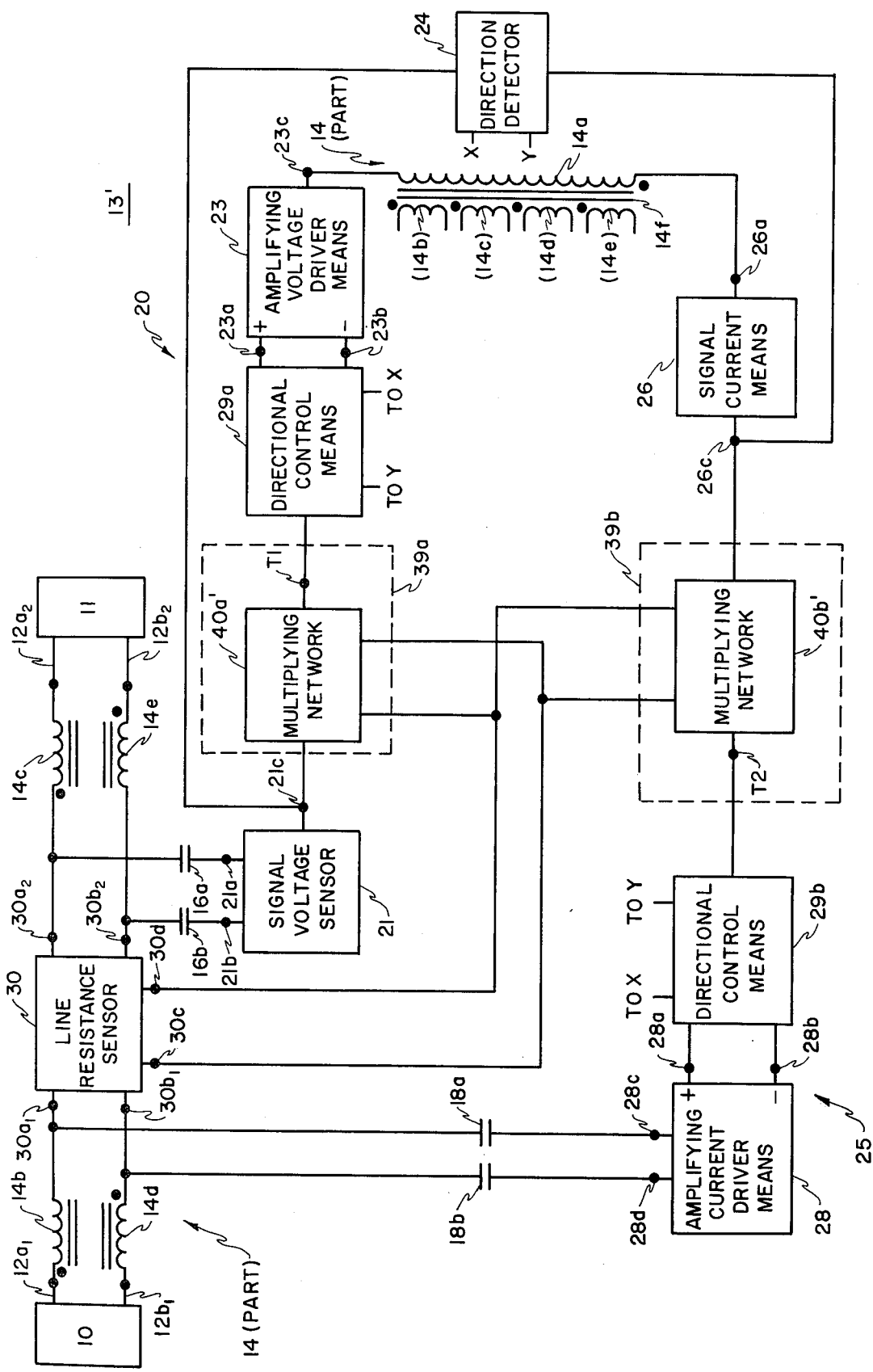
FIG. 2 is a combined block-schematic diagram which illustrates one embodiment of the circuitry of the invention.

Referring to FIG. 2, there is shown an amplifying type repeater 13' which is constructed in accordance with the invention. Repeater 13' is similar to repeater 13 shown in FIG. 1 and corresponding parts are similarly numbered. The repeater circuit of FIG. 2 differs from that of FIG. 1 primarily in that the repeater circuit of FIG. 2 includes gain control circuitry which allows repeater 13' to automatically adjust itself for operation with a variety of transmission lines. In the present illustrative embodiment, this gain control circuitry includes line resistance sensor 30, a series line resistance responsive network 39a, and a shunt line resistance responsive network 39b.

In the circuit of FIG. 2, line resistance sensor 30 serves to generate a control voltage which is proportional to the d-c resistance of the transmission line and, therefore, proportional to the a-c losses thereof. More particularly, network 30 senses the instantaneous voltage across and the instantaneous current through the transmission line and electronically divides that voltage by that current to establish, between terminals 30c and 30d, a control voltage proportional to the impedance of the transmission line. It will be understood that since the magnitudes of the d-c voltages and currents in a telephone transmission line are substantially greater than the magnitudes of the a-c voltages and currents therein, the instantaneous voltages and currents sensed by network 30 are approximately equal to the d-c voltages and currents therein. Thus, the control voltage established by sensor 30 is proportional to the d-c resistance of the transmission line and, therefore, proportional to the a-c losses thereof.

This control voltage is applied to line resistance responsive means 39a and 39b to automatically vary the series gain of amplifying voltage generating means 20 and the shunt gain of amplifying current generating means 25 in accordance with the d-c resistance of the transmission line. This allows the circuitry of the invention to vary the insertion gain provided by a repeater in accordance with changes in the d-c resistance of a transmission line due to operation in a common mode system or due to changes in temperature of a transmission line of a fixed length. More particularly, network 39a serves to decrease the ratio of the sum of the amplifying voltages across windings 14b–14e to the signal voltage across the transmission line when the control voltage indicates that the d-c resistance of the transmission line has decreased and serves to increase that ratio when the control voltage indicates that the d-c resistance of the transmission line has increased. It will be understood that network 39b serves to increase and decrease the ratio of the amplifying current to the average value of the signal current in a manner similar to network 39a.

In the present embodiment, series line resistance responsive network 39a includes a multiplying network 40a' having a first input connected to output 21c of signal voltage sensor 21 and a second input connected to outputs 30c and 30d of line resistance sensor 30. Network 40a' serves to control the magnitude of the voltage established at output T1 as a function of the voltage generated by sensor 30. Thus, line resistance responsive network 39a varies the magnitude of the series gain of voltage generating means 20 in accordance with the control voltage established by sensor 30.

Similarly, shunt line resistance responsive network 39b includes a multiplying network 40b' having a first input connected to output 26c of signal current sensor 26 and a second input connected to outputs 30c and 30d of line resistance sensor 30. Network 40b' serves to control the magnitude of the voltage established at output T2 as a function of the voltage generated by sensor 30. Thus, line resistance responsive network 39b varies the magnitude of the shunt gain of current generating means 25 in accordance with the control voltage established by sensor 30.

In view of the foregoing, it will be seen that the series and shunt gains of generating means 20 and 25, respectively, may be made to vary in accordance with the magnitude of a control voltage which indicates the a-c losses of a transmission line in order to provide repeater 13' with an insertion gain which compensates for the attenuation characteristics of loaded transmission lines of differing lengths.

a. The Operation of Line Resistance Sensor 30

Figures 3, 4:
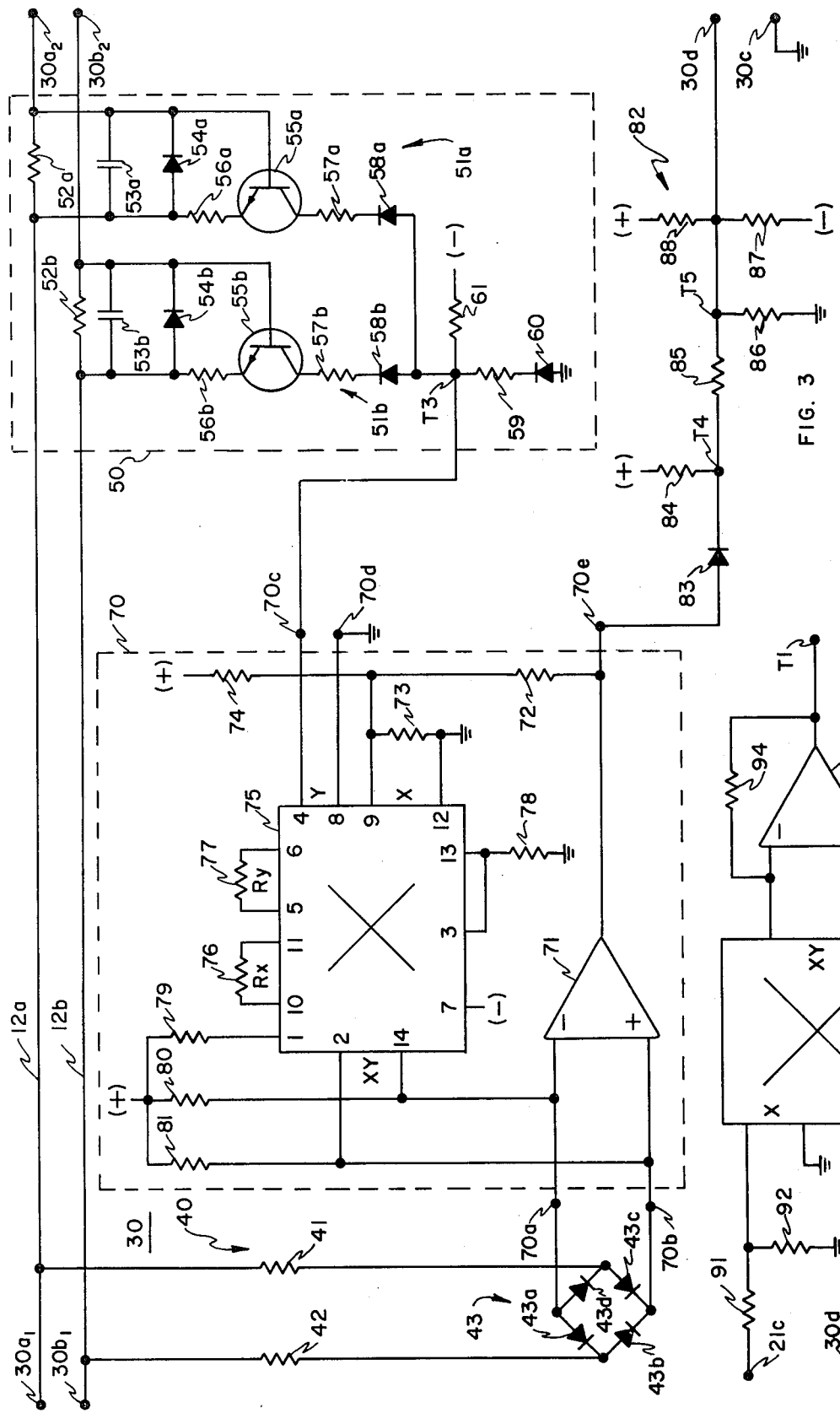
FIGS. 3 and 4 are schematic diagrams of parts of the circuitry shown in block form in FIG. 2.

The operation of line resistance sensor 30 will now be described. To the end that line resistance sensor 30 may establish, between terminals 30c and 30d, a voltage which is proportional to the d-c resistance and, therefore, the a-c losses of the transmission line, there is provided therein, as shown in FIG. 3, a voltage sensing network 40, a current sensing network 50, and an analog dividing network 70 having first input terminals 70a and 70b, second input terminals 70c and 70d, and an output terminal 70e. Voltage sensing network 40 establishes, at input terminals 70a and 70b of divider 70, a current the magnitude of which is proportional to the voltage across the transmission line. Current sensing network 50 establishes, between input terminals 70c and 70d of divider 70, a voltage the magnitude of which is proportional to the current flowing through the transmission line. Analog divider 70 generates, between output terminals 70c and ground, a voltage which is directly proportional to the current at inputs 70a and 70b and which is inversely proportional to the voltage between inputs 70c and 70d. Since, as previously described, the current at input 70a and 70b is proportional to the line voltage, and since the voltage at input 70c and 70d is proportional to the line current, it will be seen that voltage sensing network 40, current sensing network 50, and analog dividing network 70 cooperate to generate, between terminals 30c and 30d, a control voltage which is proportional to the d-c resistance of the transmission line.

It will be understood that in establishing a control voltage proportional to the d-c resistance of a transmission line, the polarity of the voltage across and the direction of the current through that line are not important. As a result, voltage sensing network 40 can be arranged to establish, at first inputs 70a–70b of analog divider 70, a current the magnitude of which is proportional to the voltage across the transmission line and the direction of which is the same without regard to the polarity of the voltage across that line. Similarly, current sensing network 50 can be arranged to establish, between second inputs 70c–70d of analog divider 70, a voltage, the magnitude of which is proportional to the current through the transmission line and the polarity of which is the same without regard to the direction of the current flowing through that line.

To the end that voltage sensor 40 may establish, at the divider input 70a and 70b, a unidirectional current the magnitude of which is proportional to the voltage across the transmission line, there are provided in voltage sensing network 40, as shown in FIG. 3, voltage sensing resistors 41 and 42 and a rectifying network 43 which here takes the form of a bridge rectifier circuit including diodes 43a, 43b, 43c, and 43d. Rectifier 43 serves to maintain a unidirectional current flow into divider input 70b and out of divider input 70a. Since the magnitude of this current is determined by the resistances of resistors 41 and 42, it will be seen that the magnitude of the current flowing between inputs 70a and 70b is proportional to the magnitude of the voltage across the transmission line. Thus, voltage sensing resistors 41 and 42 and rectifier 43 cooperate to establish at inputs 70a and 70b of divider 70, a unidirectional current proportional to the voltage across the transmission line.

To the end that current sensing network 50 establishes, between divider inputs 70c and 70d, a voltage the magnitude of which is proportional to the current through the transmission line and the polarity of which is the same without regard to the direction of current flowing through that line, there are provided in current sensing network 50, as shown in FIG. 3, first and second current gates 51a and 51b, respectively, a resistor 59, and a diode 60. When, on the one hand, line current is flowing through conductor 12a from terminal $30a_2$ to terminal $30a_1$, current gate 51a establishes, through resistor 59 and diode 60, a current the magnitude of which is proportional to that line current. When, on the other hand, current is flowing through conductor 12a in the opposite direction, current gate 51a does not establish any current flow through resistor 59 and diode 60. As a result, current gate 51a establishes across resistor 59 and diode 60 (and, therefore, across divider inputs 70c and 70d) a voltage proportional to current flowing through conductor 12a, only when that current is flowing from terminal $30a_2$ to terminal $30a_1$.

Similarly, when line current is flowing through conductor 12b from terminal $30b_2$ to terminal $30b_1$, current gate 51b establishes, through resistor 59 and diode 60, a current the magnitude of which is proportional to that line current. When, on the other hand, current is flowing through conductor 12b in the opposite direction, current gate 51b does not establish any current through resistor 59 and diode 60. As a result, current gate 51b establishes across resistor 59 and diode 60 (and, therefore, across divider inputs 70c and 70d) a voltage proportional to the current flowing through conductor 12b only when that current is flowing from terminal $30b_2$ to terminal $30b_1$. Thus, without regard to the direction in which current is flowing through the transmission line, current gates 51a and 51b, resistor 59, and diode 60 will cooperate to establish, at the inputs of divider 70, a single polarity voltage which is proportional to the current flowing through that line.

Since current gate 51b is structurally and functionally similar to current gate 51a, only current gate 51a will be described in detail, and current gate 51b will be understood to operate in a similar manner under similar conditions. To the end that current gate 51a may produce the above-described results, there are provided in current gate 51a, a current sensing resistor 52a, an a-c bypass capacitor 53a a bypass diode 54a, a transistor 55a, a resistor 56a, a current limiting resistor 57a, and a blocking diode 58a.

When line current flows from terminal $30a_1$ to terminal $30a_2$, it flows through resistor 52a and diode 54a. Under this condition, the forward voltage drop across diode 54a reverse biases transistor 55a, thereby assuring that that transistor is turned off. Blocking diode 58a prevents current from flowing through the base-collector junction of transistor 55a when the potential of conductor 12a is such that it tends to forward bias that junction. Thus, when current is flowing through conductor 12a from terminal 30a to terminal $30a_2$, current gate 51a does not establish any significant current through resistor 59.

When, on the other hand, current is flowing from terminal 30a $_2$ to terminal $30a_1$, diode 54a is reverse-biased and the voltage across resistor 52a is proportional to the line current. If the magnitude of the voltage across resistor 52a and, therefore, across resistor 56a and the base-emitter junction of transistor 55a, is sufficient to turn on transistor 55a, there will flow through the base-emitter circuit of transistor 55a and resistor 56a a current proportional to the line current. Assuming that transistor 55a is conducting, current will flow from ground through diode 60, resistor 59, diode 58a, current limiting resistor 57a, the collector-emitter circuit of transistor 55a and resistor 56a to terminal $30a_1$. If, under these conditions the resistance of resistor 56a is approximately equal to that of resistor 59 and the current flow into the collector of transistor 55a is substantially equal to the current flow out of the emitter thereof, the voltage drop across resistor 56a and the base-emitter circuit of transistor 55a (which is proportional to the line current) will be approximately equal to the voltage drop across resistor 59 and diode 60. Thus, when current is flowing from terminal $30a_2$ to terminal 30a₁, current gate 51a establishes, between divider inputs 70c and 70d, a voltage which is proportional to the line current.

If the resistance of resistor 56a cannot be assumed to be equal to the resistance of resistor 59 or that the current flow into the collector of transistor 55a cannot be assumed to be substantially equal to the current flow out of the emitter thereof, then a resistor 61 may be connected between the negative supply (−) and terminal T3 to compensate for errors in the current flow through resistor 59 and diode 60.

In view of the foregoing, it will be seen that current gates 51a and 51b cooperate to establish, at the voltage inputs of analog divider 70, a voltage the magnitude of which is proportional to the absolute value of the current flowing through the transmission line.

To the end that analog divider 70 may establish, at the output thereof, a voltage which is directly proportional to the current applied to inputs 70a and 70b thereof and which is inversely proportional to the voltage applied to inputs 70c and 70d thereof, there are provided in divider 70 an operational amplifier 71, an analog multiplier network including an analog multiplier 75, gain control resistors 76 and 77, an output scaling resistor 78, and biasing resistors 79, 80 and 81, and a voltage divider network including resistors 72 and 73. Multiplier 75 may comprise any suitable commercially available four-quadrant multiplier such as a Motorola MC1495L multiplier.

Although the operation of multiplier 75 and of dividing network 70 is well known to those skilled in the art, the operation thereof will be described, briefly, in order to afford a more complete understanding of the operation of the circuitry of the invention.

Multiplier 75 establishes, through its XY or output terminal pair 2–14, a current which is proportional to the product of the voltage between an X or input terminal pair 9–12 and the voltage at a Y or input terminal pair 4–8. The latter proportionality is primarily determined by gain control resistors 76 and 77 and by output scaling resistor 78. Resistor 76 determines the relative gain contribution of the X input, resistor 77 determines the relative gain contribution of the Y input, and output scaling resistor 78, together with resistors 76 and 77, determine the magnitude of the output current. The multiplier is powered by a suitable positive voltage source (+) connected, through bias resistor 79, to terminal 1 and by a suitable negative voltage source (−)connected to terminal 7. In addition, output terminals 2–14 are preferably biased, by resistors 80 and 81, to have a potential slightly greater than the voltage at terminal 1. Thus, resistors 76–81 cooperate with multiplier 75 to generate, at the XY output thereof, an output current proportional to the product of the voltages at the X and Y inputs.

In the present embodiment, multiplier 75 applies, to the input of amplifier 71, a negative feedback current, the magnitude of which varies in accordance with the voltages at the X and Y inputs thereof. The magnitude of the voltage at the Y input of multiplier 75 is determined by the current in the transmission line. The magnitude of the voltage at the X input of multiplier 75 is, in turn, determined by the output voltage of amplifier 71 via voltage divider 72–73, which divider is provided to prevent saturation of multiplier 75.

The above negative feedback current is algebraically summed, at the input of operational amplifier 71, with the current established through inputs 70a and 70b, so as to apply, to the input of amplifier 71, a difference current equal to the difference therebetween. Because of the characteristics of operational amplifier 71, that amplifier generates, at the output thereof, a voltage such that the magnitude of this difference current will ordinarily be substantially equal to zero.

When, for example, the magnitude of the current applied to inputs 70a and 70b increases (or decreases) the output voltage of operational amplifier 71 must increase (or decrease) in proportion in order to establish a feedback current sufficient to maintain a difference current of zero. Accompanying this increase (or decrease) in amplifier output voltage is an increase (or increase) in the voltage at divider output 70e. Thus, the voltage at divider output 70e varies directly in proportion to the current applied to input terminals 70a and 70b.

When, on the other hand, the magnitude of the voltage applied between terminals 70c and 70d increases (or decreases) the output voltage of operational amplifier 71 decreases (or increases) in order to establish a feedback current sufficient to maintain a difference current of zero. Accompanying this decrease (or increase) in amplifier output to voltage is a decrease (or increase) in the voltage at divider output 70e. Thus, the voltage at divider output 70e varies inversely in proportion to the voltage applied between input terminals 70c and 70d.

In view of the foregoing, it will be seen that divider 70 establishes, between output terminal 70e and ground, a voltage the magnitude of which varies directly in proportion to the magnitude of the voltage across the transmission line and which varies inversely in proportion to the magnitude of the current through the transmission line. Thus, divider 70 generates, at output 70e thereof, a voltage which varies in proportion to the d-c resistance of the transmission line.

In some telephone systems, it may be desirable to provide a repeater in which the insertion gain increases only after the d-c resistance of the transmission line exceeds a predetermined value, e.g., a d-c resistance of one thousand ohms. In these telephone systems, it is desirable for a self-adjusting amplifying repeater to provide a zero insertion gain for transmission lines having a d-c resistance less than one thousand ohms and to increase the gain provided thereby as the resistance of the transmission line increases above one thousand ohms. As a result, the response of the system including the repeater and a transmission line will follow the attenuation characteristic of the transmission line for lines having a d-c resistance less than one thousand ohms and will follow the attenuation characteristic of a transmission line having a resistance of one thousand ohms for lines having a resistance greater than one thousand ohms.

To the end that the above results may be accomplished, there are provided in FIG. 3 an offset resistor 74 connected between the positive supply (+) and the X input terminal of multiplier 75 and a biasing circuit 82 connected between divider output 70e and sensor output 30d. Resistor 74 establishes, at terminal 70e, a d-c offset voltage which will be negative for transmission lines having a d-c resistance less than a predetermined value, e.g., 1000 ohms, and will be positive for transmission lines having a d-c resistance greater than that predetermined value. Biasing circuit 82 establishes at output 30d, a voltage approximately equal to zero when the voltage at divider output 70e is negative and a voltage approximately equal to the voltage at divider output 70e when that divider output voltage is positive. As a result, the voltage between sensor outputs 30d–30c will be approximately equal to zero for transmission lines having a d-c resistance less than a predetermined value and will increase from that zero value as the d-c resistance of the transmission line increases from that predetermined value.

Resistor 74 establishes a positive d-c offset voltage at the X input of multiplier 75 and, therefore, a positive offset voltage at the output of multiplier 75. Since amplifier 71 is an inverting amplifier, the positive offset voltage at the X input of the multiplier 75 establishes a negative offset voltage at the output of amplifier 71. In the present embodiment, the resistance of resistor 74 is adjusted so as to establish at the X input of multiplier 75, an offset voltage which causes the voltage at divider output 70e to be substantially equal to zero when the d-c resistance of the transmission line is at a value of one thousand ohms.

Biasing circuit 82 establishes, between sensor output terminals 30d and 30c, an output voltage which is substantially equal to zero when the voltage at divider output 70e is negative and an output voltage which increases with increases in the divider output voltage when that divider output voltage is positive. To this end, there are provided in biasing circuit 82, a diode 83 and a first voltage divider network comprised of resistors 84, 85, and 86 having its ends connected between the positive supply (+) and ground having a first tap T4 connected to diode 83 and a second tap T5 connected to output terminal 30d.

When the voltage at divider output 70e is negative, voltage divider 84–86 serves to reverse bias diode 83 and to establish a fixed output voltage at tap T5. When the voltage at divider output 70e is positive, voltage divider 84–86 serves to establish, at output 30d, a fixed percentage of the voltage at output 70e. Thus, resistor 74 and biasing circuit 82 establish, between outputs 30d and 30c, a voltage which is substantially equal to zero when the d-c resistance of the transmission line is less than a predetermined value and a voltage which increases from that zero value as the d-c resistance of the transmission line increases from that predetermined value.

If it is desirable to establish, at output 30d, a bias voltage other than zero, this d-c bias may be established by connecting a second voltage divider network 87–88 as shown in FIG. 3. Voltage divider 87–88 is comprised of resistors 88 and 87 and has its ends connected between the positive supply (+) and the negative supply (−) and its tap connected to output 30d. As a result of this connection, either a negative or positive d-c bias may be established at output 30d.

In view of the foregoing, it will be seen that line resistance sensor 30 establishes, at the output thereof, a control voltage which is proportional to the d-c resistance and, therefore, to the a-c losses of the transmission line. It will also be seen that the magnitude of this control voltage may be relatively constant for transmission lines having a d-c resistance less than a predetermined value.

b. Multiplying Networks 40a' and 40b'

To the end that this control voltage may vary the magnitude of the series gain exhibited by amplifying voltage generating means 20 there is provided therein, as shown in FIG. 2, a first multiplying network 40a'. Similarly, to the end that the magnitude of the control voltage may vary the magnitude of the shunt gain exhibited by amplifying current generating means 25, there is provided therein, as shown in FIG. 2, a second multiplying network 40b'. Since multiplying network 40a' is substantially identical to and operates in the same manner as multiplying network 40b', only network 40a' will be described in detail and network 40b' will be understood to operate in a similar manner under similar conditions.

Referring to FIG. 4, there is shown the circuit detail of multiplying network 40a'. Network 40a' includes an analog multiplying network 90, an operational amplifier 93, feedback resistors 94 and 95, and a voltage divider network comprised of resistors 91 and 92. Since multiplier 90 is operationally and functionally similar to multiplier 75 shown in FIG. 3, the biasing, gain-control and output scaling resistors have been omitted from FIG. 4.

Analog multiplier 90 establishes, at the XY output thereof, a current which is proportional to the product of the voltage at the X input and the voltage at the Y input thereof. Since voltage divider 91–92 applies a fixed percentage of the voltage at terminal 21c to the X input of multiplier 90, the voltage at the X input is proportional to the voltage established by sensor 21 and, therefore, proportional to the signal voltage across the transmission line. Since the control voltage established by sensor 30 is applied to the Y input of multiplier 90, the voltage at the Y input is proportional to the resistance of the transmission line. Thus, multiplier 90 establishes a current which is proportional to the signal voltage across the transmission line and to the resistance of the transmission line.

Operational amplifier 93 and feedback resistors 94 and 95 cooperate to generate, at output T1, a voltage which is proportional to the current at the input of amplifier 93 and 180° out of phase with that current. As a result, the voltage generated at terminal T1 varies in accordance with the signal voltage across the transmission and in accordance with the resistance of that line.

In view of the foregoing, it will be seen that first multiplying network 40a' of FIG. 2 serves to vary, as a function of the d-c resistance of the transmission line, the series gain provided by amplifying voltage generating means 20. Similarly, it will be seen that second multiplying network 40b' serves to vary as a function of the d-c resistance of the transmission line, the shunt gain provided by amplifying current generating means 25. Thus, line resistance sensor and variable gain means 40a' and 40b' vary the gain of repeater 13' in accordance with the d-c resistance and, therefore, the a-c losses of the transmission line connected thereto.

It will be understood that since networks 40a' and 40b' shift the phase of the voltages at terminals T1 and T2 180° with respect to the voltages at terminals 21c and 26c, respectively, it may be desirable to compensate for this 180° phase shift. Voltage driver input 23a may, for example, be interchanged with voltage driver input 23b and current driver input 28a may be interchanged with current driver input 28b in order to compensate for the 180° phase shift introduced by networks 40a' and 40b', as may be seen by comparing FIGS. 1 and 2.

It will be understood that the circuitry of the invention may also be utilized in an amplifying repeater having series and shunt amplifying networks to modify the impedance matching characteristic provided thereby in accordance with the a-c losses of the transmission line. The impedance matching characteristics of a transmission line may, for example, be modified in accordance with the a-c losses of the transmission line connecting tap T1 of FIG. 2 directly to non-inverting input 23a of amplifying voltage driver means 23 and by connecting tap T2 of FIG. 2 directly to inverting input 28b of amplifying current driver means 28.

Impedance Simulating Type Circuit

As mentioned previously, the transmission characteristics of a transmission line may be modified by utilizing a circuitry which simulates the presence of positive impedances in series and shunt with the transmission line. A prior art circuit of the above type which simulates the presence of positive impedances is shown, in FIG. 5, as an impedance simulating circuit 19. Circuitry of the above character is shown and described in the U.S. patent of Charles W. Chambers, Jr., U.S. Pat. No. 3,828,281, entitled "Impedance Simulating Circuit for Transmission Lines," the disclosure of which is hereby expressly incorporated herein by reference. In order to facilitate an understanding of the operation of the present invention, the operation of the circuitry shown in FIG. 5 will be described, briefly, before describing how the structure and operation of that circuitry is modified to afford the present invention.

Figure 5:
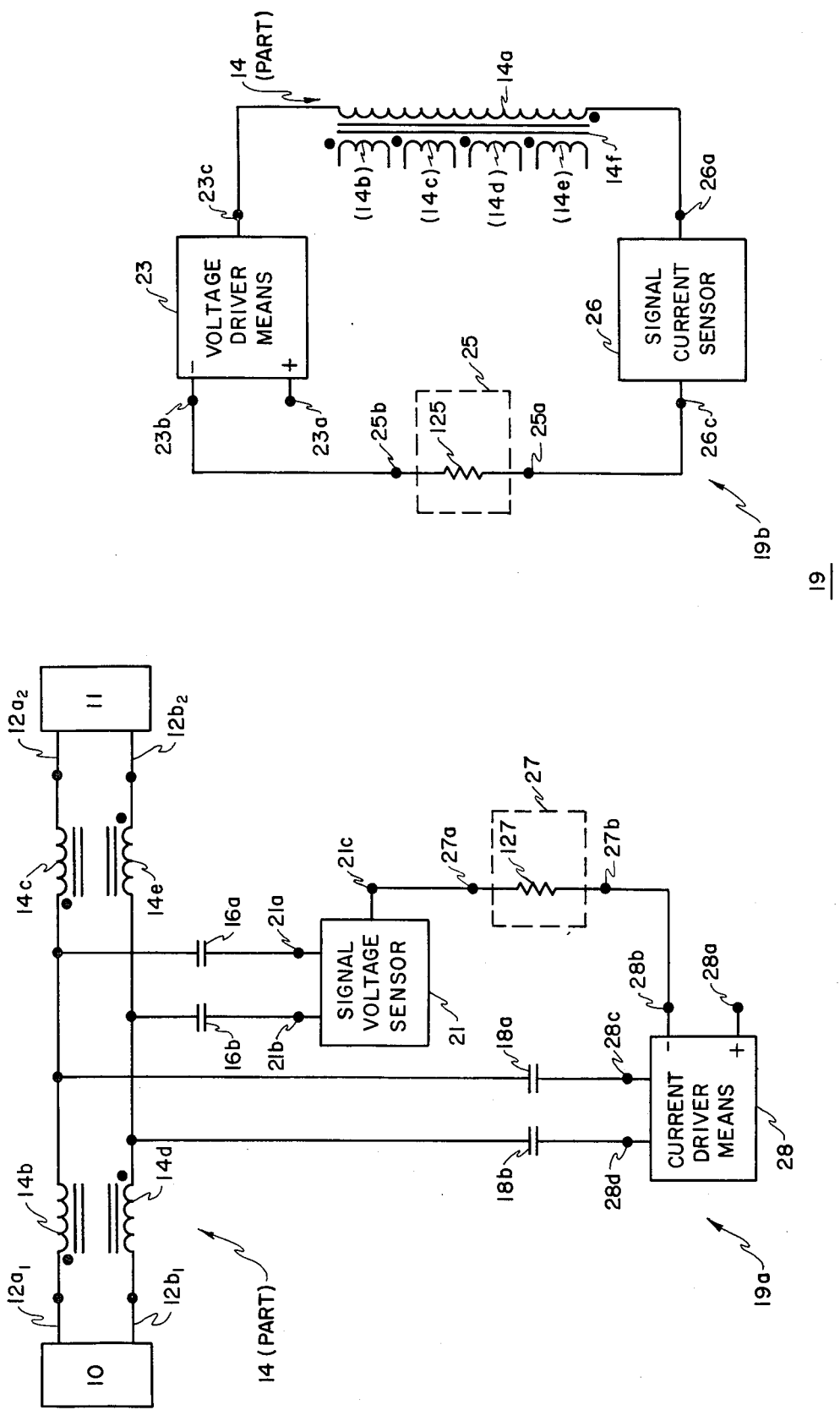
FIG. 5 is a combined block-schematic diagram which illustrates a repeater known to the art.

To the end that impedance simulating type circuit 19 may simulate the presence of a positive resistance in shunt with the transmission line, there is provided therein, as shown in FIG. 5, a shunt impedance simulating network 19a which senses the signal voltage across the transmission line and inserts, in shunt with that line, a current which simulates the presence of a positive impedance connected in shunt with that line. Shunt impedance simulating network 19a includes a signal voltage sensor 21, feedback means 27, current driver means 28, and coupling capacitors 16a, 16b, 18a, and 18b.

Feedback means 27 serves to determine the magnitude and character of the simulated shunt impedance. If, for example, feedback means 27 includes a resistor 127 as connected in FIG. 5, the simulated shunt impedance will be a positive resistance. In particular, if the resistance of resistor 127 is relatively small, the positive resistance simulated in shunt with the transmission line will be relatively small and if the resistance of resistor 127 is relatively large, the resistance simulated in shunt with the transmission line will be relatively large. In other words, the resistance simulated in shunt with the transmission line varies directly in proportion to the resistance of resistor 127. Thus, shunt impedance simulating network 19a generates, in shunt with the transmission line, a variable current which affects signal transmission through that line in the same manner as a positive resistance connected in shunt with the line.

As described in the aforementioned U.S. Pat. No. 3,828,281, the sign of the simulated shunt resistance is determined by the phase relationship between the input and output signals of shunt impedance simulating network 19a. If, for example, it is desirable to establish a negative resistance in shunt with the transmission line, that desired negative shunt resistance may be simulated by the circuitry shown in FIG. 5 by connecting feedback means 27 between voltage sensor output 21c and non-inverting input 28a of current driver means 28. In other words, the sign of the shunt resistance simulated by network 19a of FIG. 5 may be changed by introducing a 180° phase shift between the input and output signals of network 19a.

To the end that impedance simulating circuit 19 may simulate the presence of one or more positive resistances in series with the transmission line, there is provided therein a series impedance simulating network 19b which senses the current flowing through the transmission line and inserts, in series with the line, a voltage which simulates the effect of series connected positive impedances. Series impedance simulating network 19b includes a signal current sensor 26, feedback means 25, voltage driver means 23 and a transformer 14 having a primary winding 14a and secondary windings 14b–14c wound on a common core 14f.

Feedback means 25 serves to determine the magnitude and character of the simulated series impedances. If, for example, feedback means 25 includes a resistor 125 as connected in FIG. 5, the simulated series impedances will be a positive resistance. In particular, if the resistance of resistor 125 is relatively small, the simulated positive resistances in series with the line will be relatively large and if the resistance of resistor 125 is relatively large, the simulated positive resistances in series with the line will be relatively small. In other words, the positive resistance simulated in series with the transmission line varies inversely in proportion to the resistance of resistor 125. Thus, series impedance simulating network 19b generates, in series with the transmission line, a variable voltage which affects signal transmission through that line in the same manner as a positive resistance connected in series with the line.

As described in the aforementioned U.S. Pat. No. 3,828,281, the sign of the series resistance simulated by network 19b may be changed in a manner similar to that of network 19a. More particularly, the sign of the series resistance simulated by network 19b of FIG. 5 may be changed by introducing a 180° phase shift between the input and output signals of network 19b.

Although a given impedance simulating circuit of the type shown in FIG. 5 may establish a predetermined image impedance, i.e., a predetermined impedance for the combination of the impedance simulating circuit and the section of the transmission line, for a particular length section of transmission line, it is unable to establish that same predetermined impedance for a different length section of transmission line. This is because the impedance provided by a given impedance simulating circuit of the type shown in FIG. 5 remains substantially constant while the impedance of differing lengths of sections of transmission lines varies in proportion to the length of the section of transmission line. Thus, the impedance simulating type circuit is unable to maintain a predetermined impedance for the combination of the impedance simulating circuit and the differing lengths of section of transmission lines, i.e., to maintain a relatively constant image impedance for differing lengths of sections of transmission lines. Thus, the impedance simulating type circuit shown in FIG. 5 is unable to automatically adjust the impedances simulated thereby in accordance with the impedance of the transmission lines connected thereto.

In accordance with a third embodiment of the circuitry of the invention, there is provided impedance control circuitry which automatically varies the magnitudes of the impedances simulated by an impedance simulating type repeater in accordance with the length of the transmission line. More particularly, the impedance control circuitry of the invention varies the simulated series and shunt resistances of an impedance simulating repeater in proportion to the d-c resistance of the transmission line to provide a substantially constant image impedance for each section of transmission line connected thereto.

Figure 6:
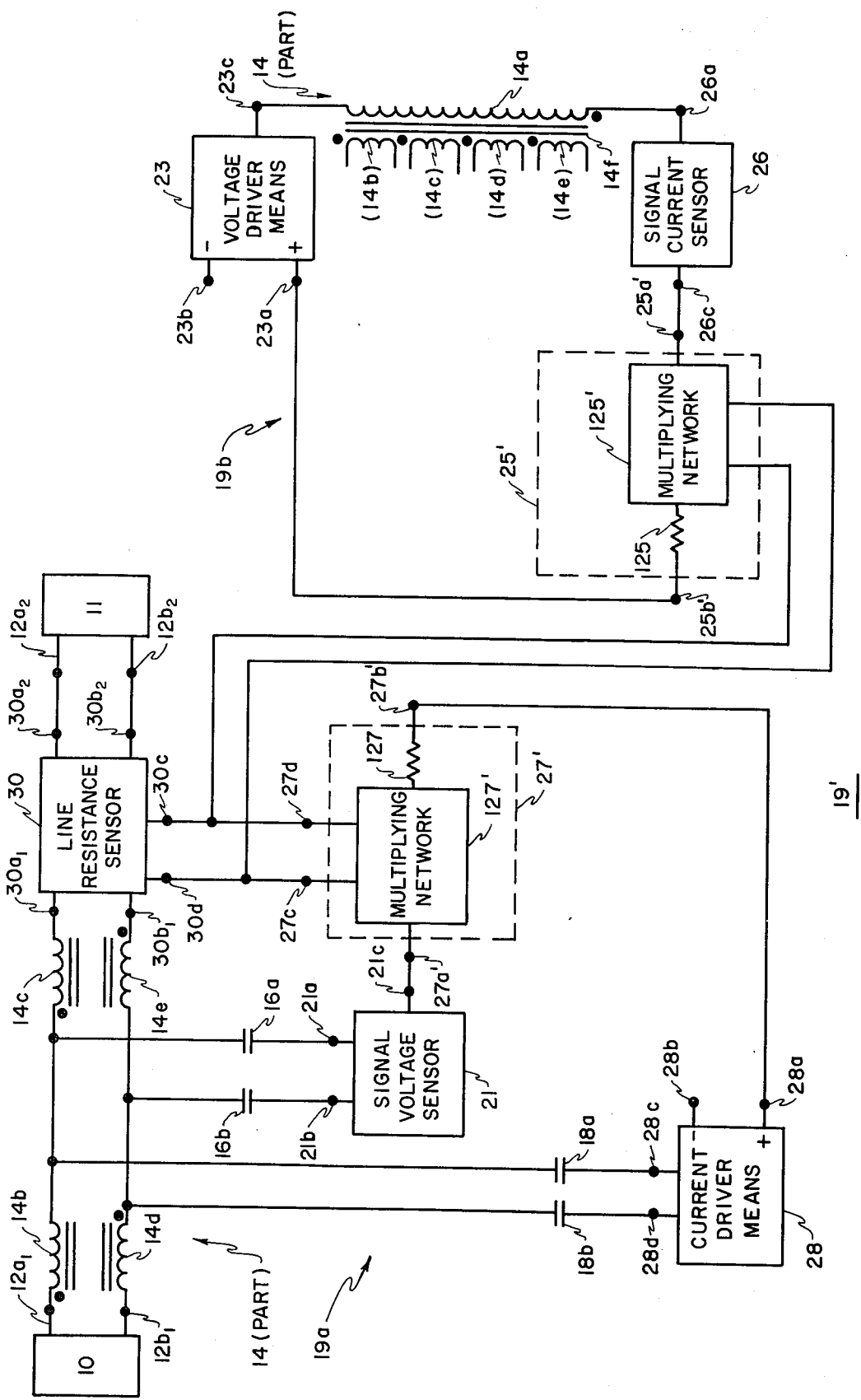
FIG. 6 is a combined block-schematic diagram which illustrates another embodiment of the circuitry of the invention.

Referring to FIG. 6, there is shown an impedance simulating type circuit 19' which simulates the presence of an electronically controllable positive resistance in shunt with the transmission line and which simulates the presence of an electronically controllable positive resistance in series with the transmission line. Impedance simulating circuit 19' of FIG. 6 is similar in many respects to impedance simulating circuit 19 of FIG. 5 and corresponding parts are similarly numbered. In the circuit of FIG. 6, however, impedance control circuitry which is conceptually similar to the gain control circuitry of FIG. 2 has been added. More particularly, the circuit of FIG. 6 differs from that of FIG. 5 in that the circuit of FIG. 6 includes a line resistance sensor 30 connected between conductor pairs $12a_1$–$12b_1$ and $12a_2$–$12b_2$ and includes line resistance responsive networks 25' and 27' in the place of feedback resistors 125 and 127. In the present embodiment, line resistance responsive networks 25' and 27' include multiplying networks 125' and 127' which are structurally and functionally similar to multiplying network 40a' shown in FIG. 4. Because of this similarity, networks 125' and 127' will not be described herein in detail.

In the circuit of FIG. 6, line resistance sensor 30 serves to generate a control voltage which varies in accordance with the d-c resistance of the transmission line. This control voltage is applied to multiplying networks 125' and 127' to vary the simulated series and shunt positive resistances in accordance with the d-c resistance of the transmission line. As a result, an impedance simulating type repeater constructed in accordance with the invention can vary the impedance simulated thereby automatically, in accordance with changes in the d-c resistance of a transmission line, and thereby adapt itself for operation in a common mode system.

One method of operating an impedance simulating type circuit 19' as a self-adjusting impedance simulating circuit is to vary the simulated shunt resistance directly in proportion to changes in the d-c resistance of the transmission line and to vary the simulated series resistance inversely in proportion to changes in that d-c resistance. By varying the series and shunt negative resistances in the above-described manner, the impedance simulating circuit shown in FIG. 6 establishes impedances the magnitude of which are dependent upon the d-c resistance of the transmission line. As a result, the variable impedances provided by repeater 19' combine with the differing impedances of different lengths of sections of transmission lines to establish a substantially constant image impedance for each section of transmission line connected thereto.

To the end that the positive resistance simulated in shunt with the transmission line may vary directly in proportion to changes in the d-c resistance of the transmission line, there is provided in network 19a' multiplying network 127'. The output voltage established by network 127' varies directly in proportion to the magnitude of control voltage $V_c$ in a manner similar to multiplying network 40a' discussed in connection with FIG. 4. Since, as previously described, the magnitude of the simulated shunt resistance of FIG. 5 varies directly in proportion to the resistance of resistor 127, it will be seen that the magnitude of the simulated shunt resistance of FIG. 6 varies directly in proportion to the magnitude of the output voltage of network 127'. As a result of the direct relationship between the output voltage of network 127' and control voltage and of the direct relationship between the magnitude of the simulated shunt resistance and the magnitude of the voltage applied to driver 28, the simulated shunt resistance varies directly in proportion to control voltage $V_c$. In other words, the magnitude of the simulated shunt resistance varies directly in proportion to the d-c resistance of the transmission line.

To the end that the positive resistance simulated in series with the transmission line may vary inversely in proportion to changes in the d-c resistance of the transmission line, there is provided in network 19b' multiplying network 127'. The output voltage established by network 127' varies directly in proportion to the magnitude of control voltage $V_c$ in a manner similar to network 40a' discussed in connection with FIG. 4. Since, as previously described, the magnitude of the simulated series resistance of FIG. 5 varies inversely in proportion to the resistance of resistor 125 of FIG. 5, it will be seen that the simulated series resistance of FIG. 6 varies inversely in proportion to the output voltage of multiplier 125'. As a result of the direct relationship between the output voltage of multiplier 125' and control voltage $V_c$ and of the inverse relationship between the simulated series resistance and the output voltage of network 25, the simulated series resistance varies inversely in proportion to control voltage $V_c$. In other words, the positive resistance simulated in series with the transmission line varies inversely in proportion to the d-c resistance of the transmission line.

In view of the foregoing, it will be seen that the positive resistance simulated in shunt with the transmission line varies directly in proportion to the d-c resistance of the transmission line and that the positive resistance simulated in series with the transmission line varies inversely in proportion to that d-c line resistance. As a result of the above-described relationship between the positive series and shunt resistances and control voltage $V_c$, the impedance simulating type circuit of FIG. 6 automatically adjusts the magnitudes of the impedances simulated thereby in accordance with the d-c resistance of the transmission line so as to establish a substantially constant image impedance for each section of transmission line connected thereto.

It will be understood that since multiplying networks 125' and 127' shift the phase of the voltages at terminals 25b' and 27b' 180° with respect to the voltages at terminals 25d' and 27a', respectively, it may be desirable to compensate for the 180° phase shift. Voltage driver input 23a may, for example, be interchanged with voltage driver input 23b and current driver input 28a may be interchanged with current driver input 28b. These interchanges in driver inputs may be seen in comparing FIGS. 5 and 6.

It will be understood that the embodiments shown herein are for illustrative purposes only and may be changed or modified without departing from the spirit and scope of the appended claims.

I claim:

1. In an apparatus for modifying the transmission characteristics of a telephone transmission line, the combination of:

means for generating a control signal proportional to the a-c losses of the transmission line;

shunt impedance simulating means for generating an impedance simulating current which varies in accordance with the signal voltage across the transmission line, the shunt impedance simulating means including first control signal responsive means for causing the magnitude of the impedance simulating current to vary directly with the product of the control signal and the signal voltage;

series impedance simulating means for generating an impedance simulating voltage which varies in accordance with the signal current through the transmission line, the series impedance simulating means including second control signal responsive means for causing the magnitude of the impedance simulating voltage to vary directly with the product of the control signal and the signal current;

means for applying a signal which varies in accordance with the signal voltage across the transmission line to the shunt impedance simulating means;

means for applying a signal which varies in accordance with the signal current through the transmission line to the series impedance simulating means;

means for applying the impedance simulating current in shunt with the transmission line; and means for applying the impedance simulating voltage in series with the transmission line.

2. A circuit as set forth in claim 1 wherein the control signal generating means comprises line resistance sensing means including:

line voltage sensing means for sensing the instantaneous voltage across the transmission line and for establishing a signal which varies in accordance therewith;

line current sensing means for sensing the instantaneous current in the transmission line and for establishing a signal which varies in accordance therewith; and analog dividing means for establishing a control signal proportional to the a-c losses of the transmission line by electronically dividing the signal established by the line voltage sensing means by the signal established by the line current sensing means.

3. A circuit as set forth in claim 2 wherein the voltage sensing means includes rectifying means for establishing a signal without regard to the polarity of the voltage across the transmission line.

4. A circuit as set forth in claim 2 wherein the current sensing means includes first and second current gating means for establishing a signal without regard to the direction of current flow through the transmission line.

5. In an apparatus for modifying the transmission characteristics of a telephone transmission line, the combination of:

current driver means for generating an impedance simulating current, the current driver means having an input and an output;

voltage driver means for generating an impedance simulating voltage, the voltage driver means having an input and an output;

signal voltage sensing means for sensing the signal voltage across the transmission line and for energizing the input of the current driver means in accordance therewith;

signal current sensing means for sensing the signal current through the transmission line and for energizing the input of the voltage driver means in accordance therewith;

means for applying the impedance simulating current at the output of the current driver means in shunt with the transmission line;

means for applying the impedance simulating voltage at the output of the voltage driver means in series with the transmission line;

line resistance sensing means for generating a control signal proportional to the resistance of the transmission line;

first line resistance responsive means for energizing the input of the current driver means in accordance with the product of the control signal and the signal voltage across the line; and second line resistance responsive means for energizing the input of the voltage driver means in accordance with the product of the control signal and the signal current through the line.

6. A circuit as set forth in claim 5 wherein the line resistance sensing means includes:

line voltage sensing means for sensing the instantaneous voltage across the transmission line and for establishing a line voltage signal which varies in accordance therewith;

line current sensing means for sensing the instantaneous current in the transmission line and for establishing a line current signal which varies in accordance therewith; and analog dividing means for generating a control signal proportional to the resistance of the transmission line by electronically dividing the line voltage signal by the line current signal.

7. A circuit as set forth in claim 6 wherein the line voltage sensing means includes rectifying means for establishing a signal without regard to the polarity of the voltage across the transmission line.

8. A circuit as set forth in claim 6 wherein the line current sensing means includes first and second current gating means for establishing a signal without regard to the direction of current flow through the transmission line.

* * * * *